Figure 1:
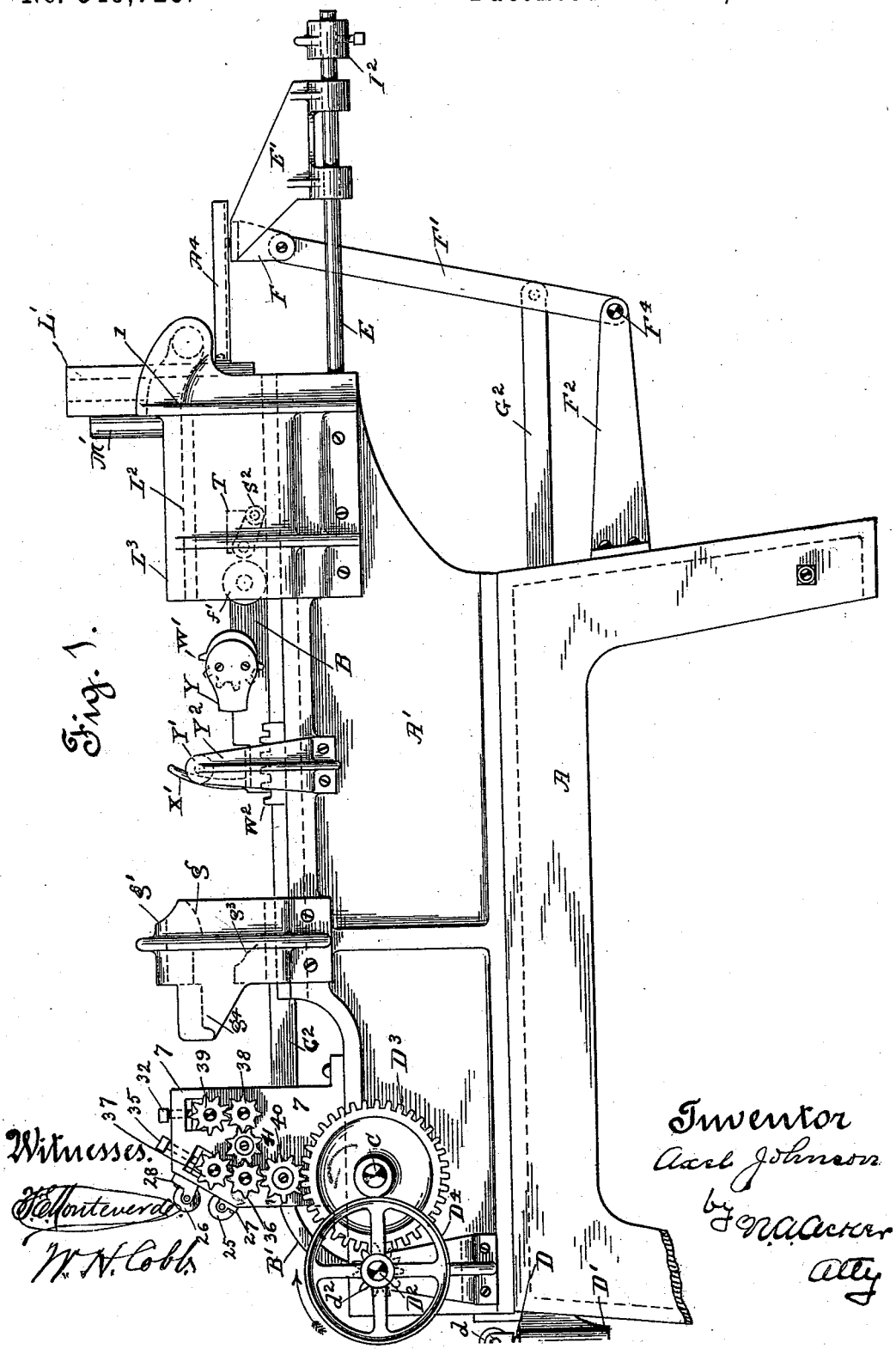

(No Model.) 11 Sheets—Sheet 1.
A. JOHNSON.
CAN BODY BLANK CUTTING MACHINE.

No. 549,725. Patented Nov. 12, 1895.

Witnesses.

Inventor
Axel Johnson
by N. A. Acker
Atty

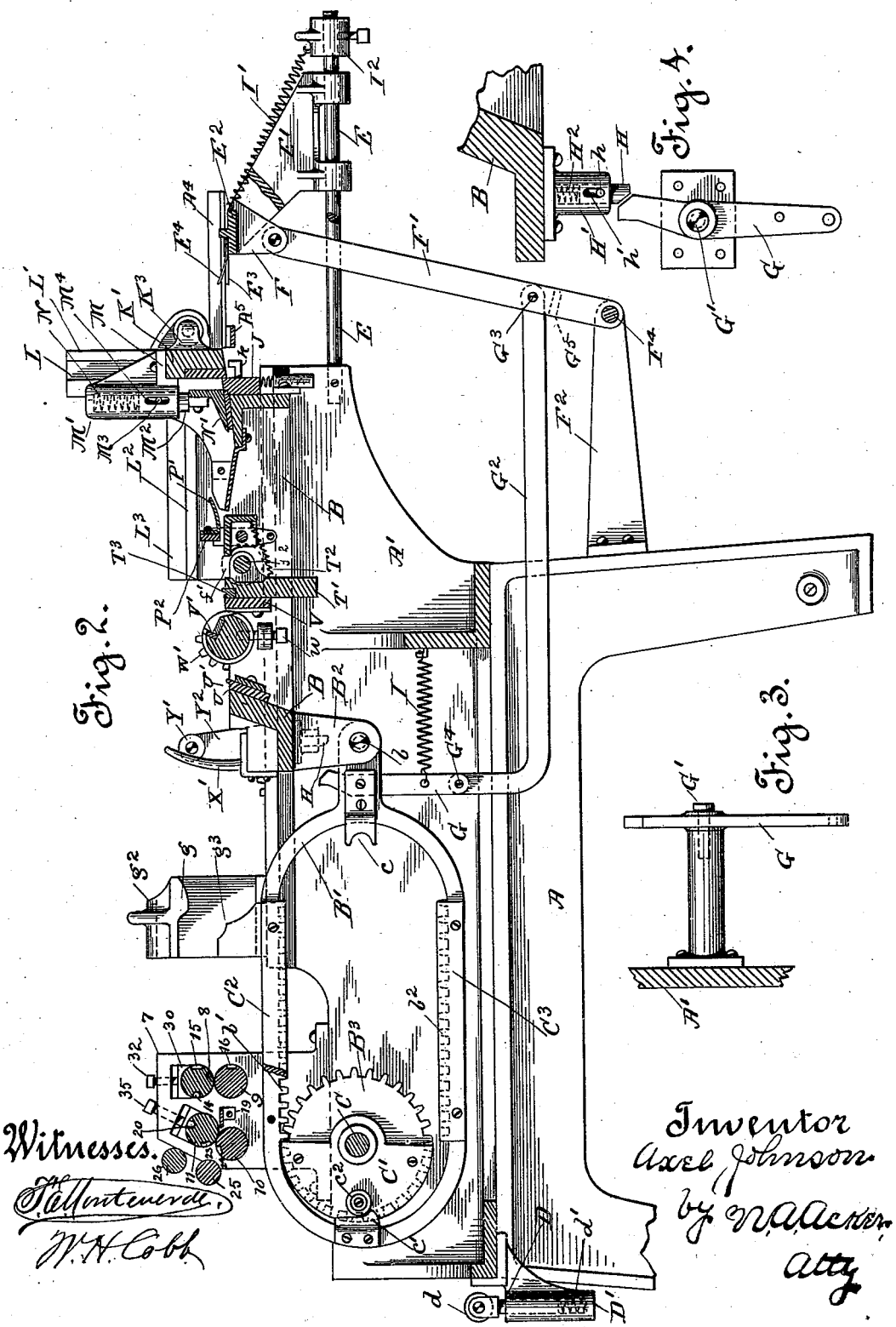

(No Model.) 11 Sheets—Sheet 3.
A. JOHNSON.
CAN BODY BLANK CUTTING MACHINE.
No. 549,725. Patented Nov. 12, 1895.

Witnesses.
Inventor.
A. Johnson
by N. A. Acker,
atty.

(No Model.) 11 Sheets—Sheet 5.

A. JOHNSON.
CAN BODY BLANK CUTTING MACHINE.

No. 549,725. Patented Nov. 12, 1895.

Witnesses.
Inventor.
Axel Johnson

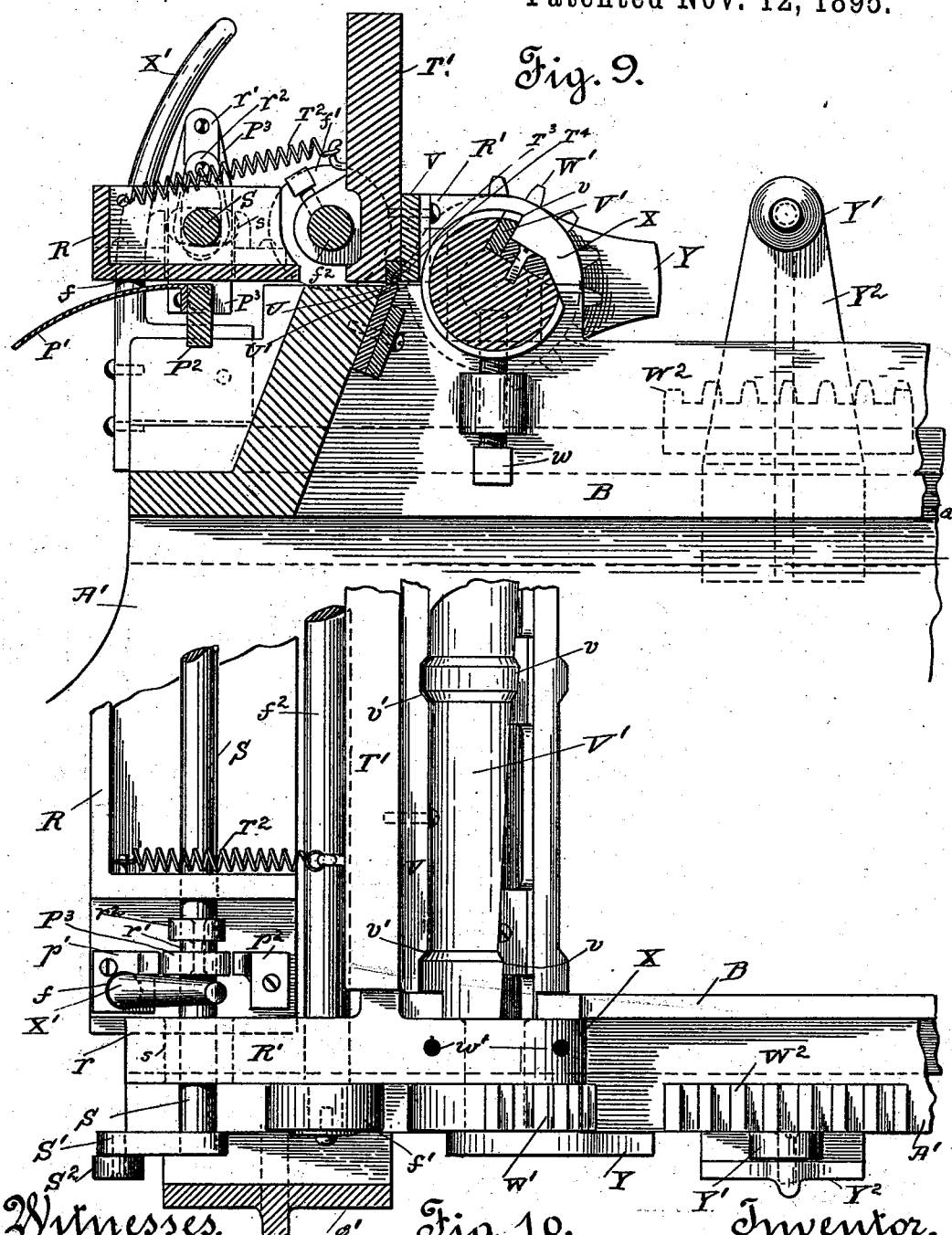

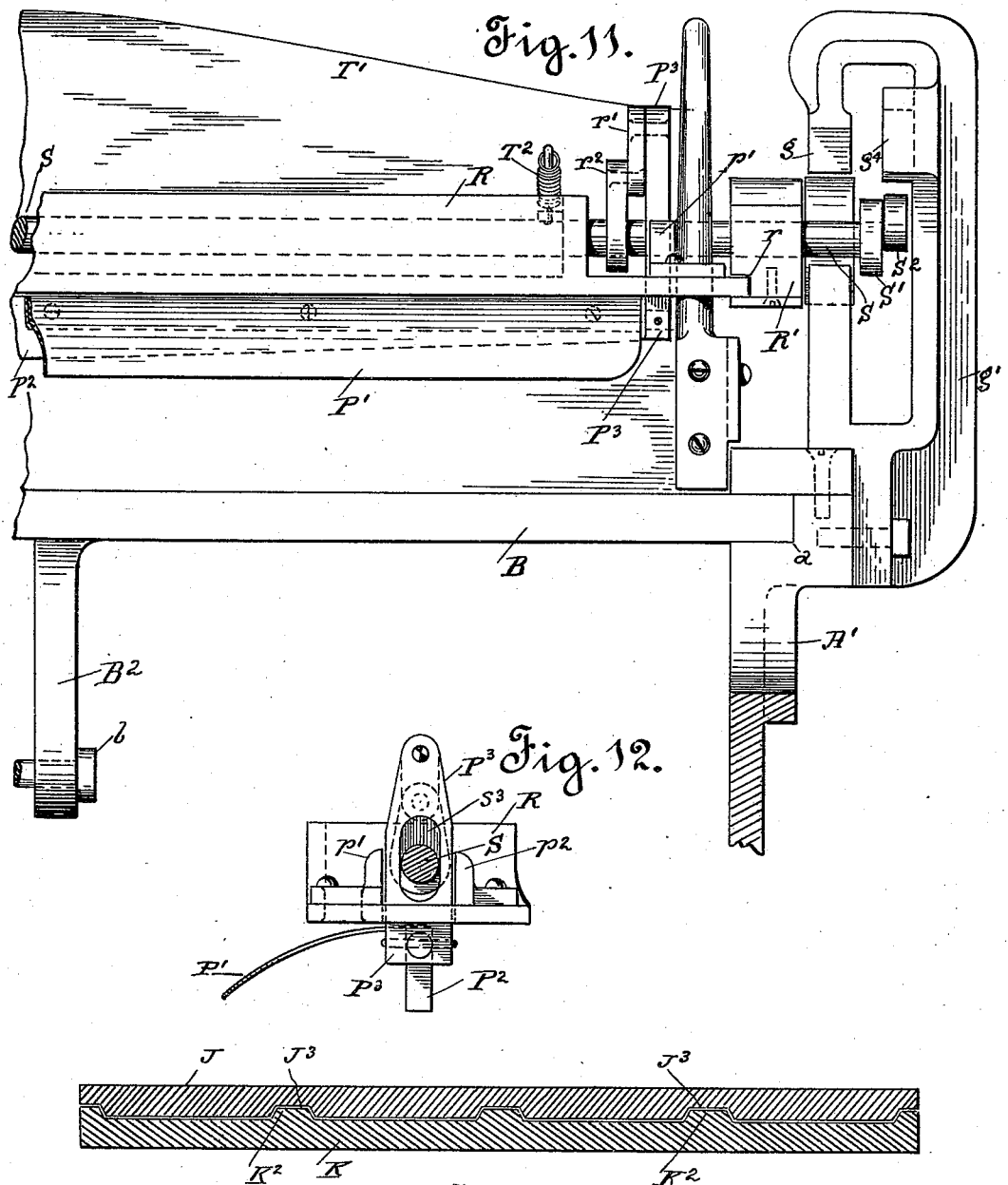

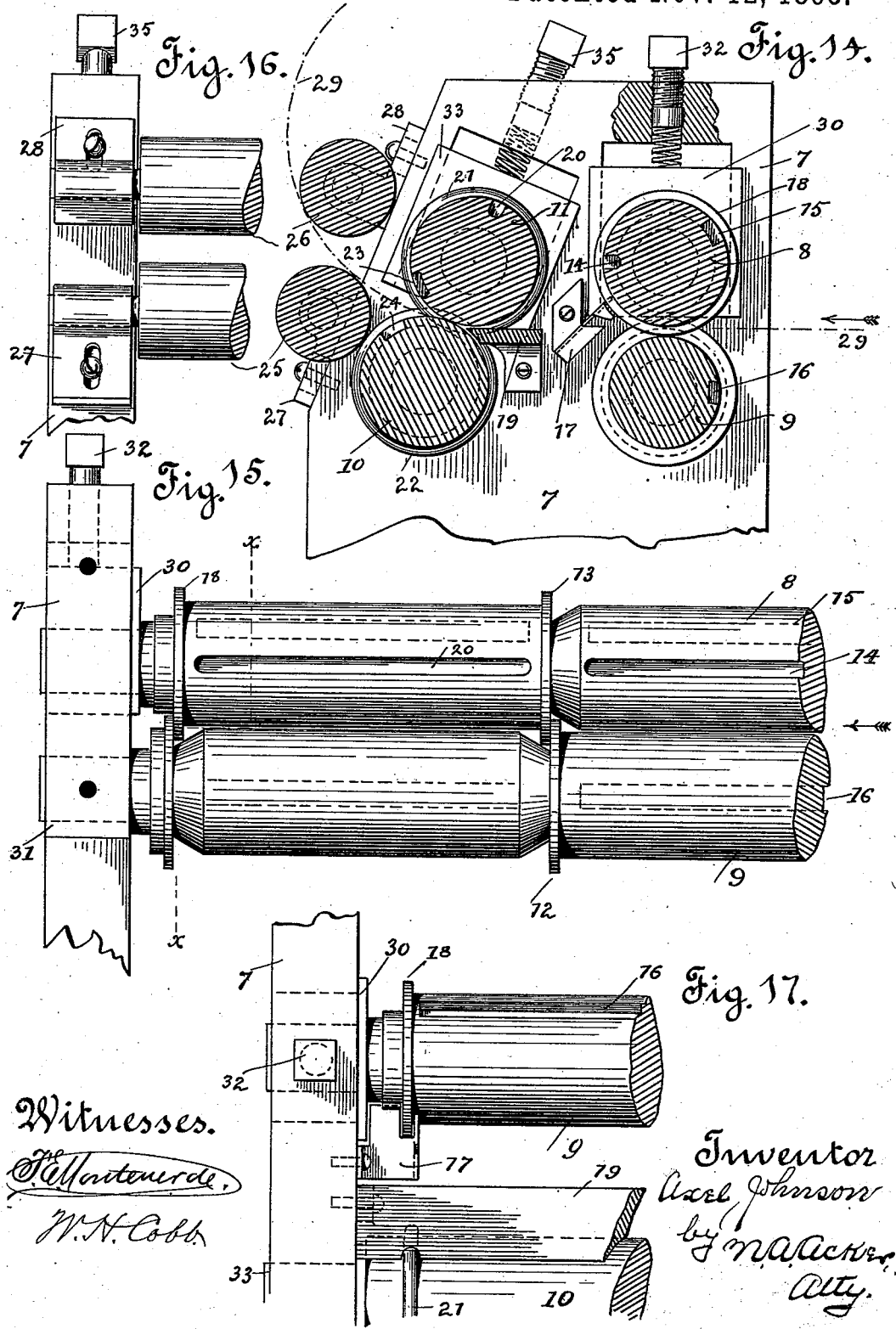

(No Model.)
11 Sheets—Sheet 9.
A. JOHNSON.
CAN BODY BLANK CUTTING MACHINE.
No. 549,725.
Patented Nov. 12, 1895.
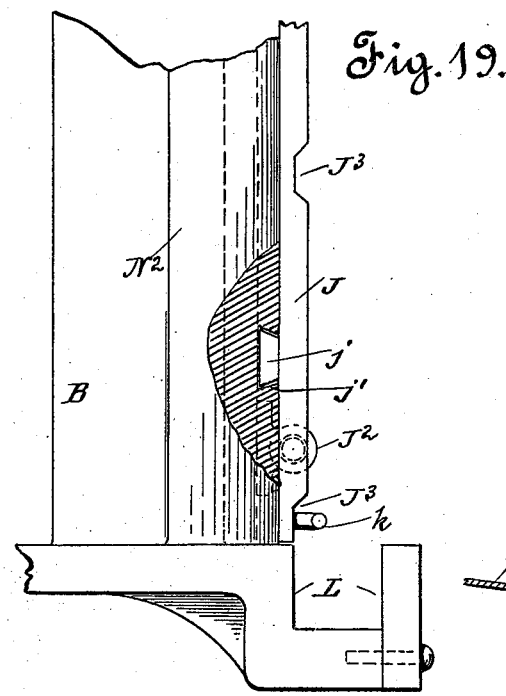
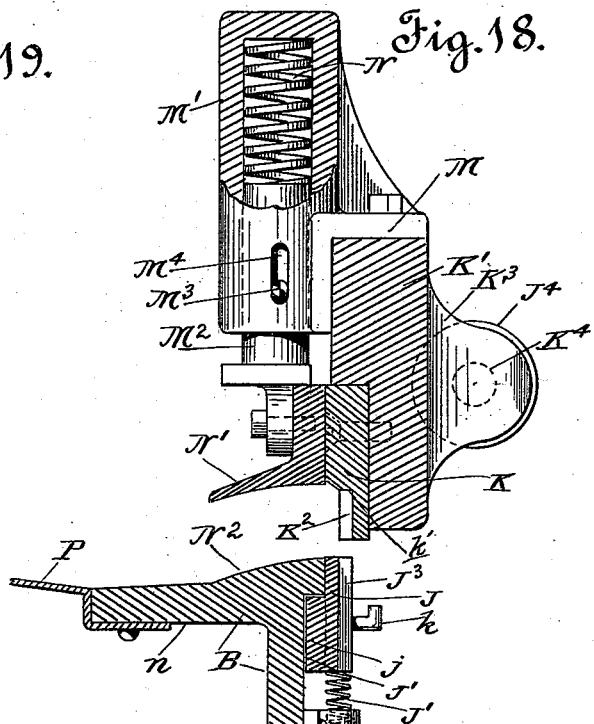
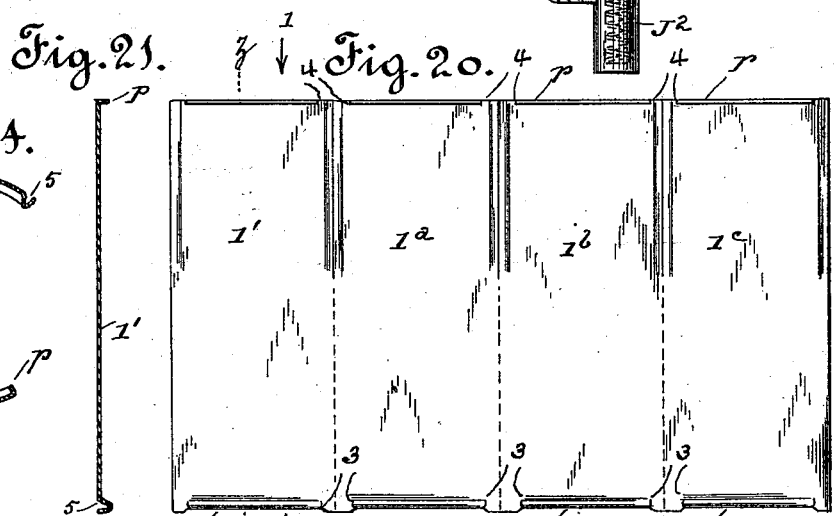
Witnesses.
Inventor.
Axel Johnson

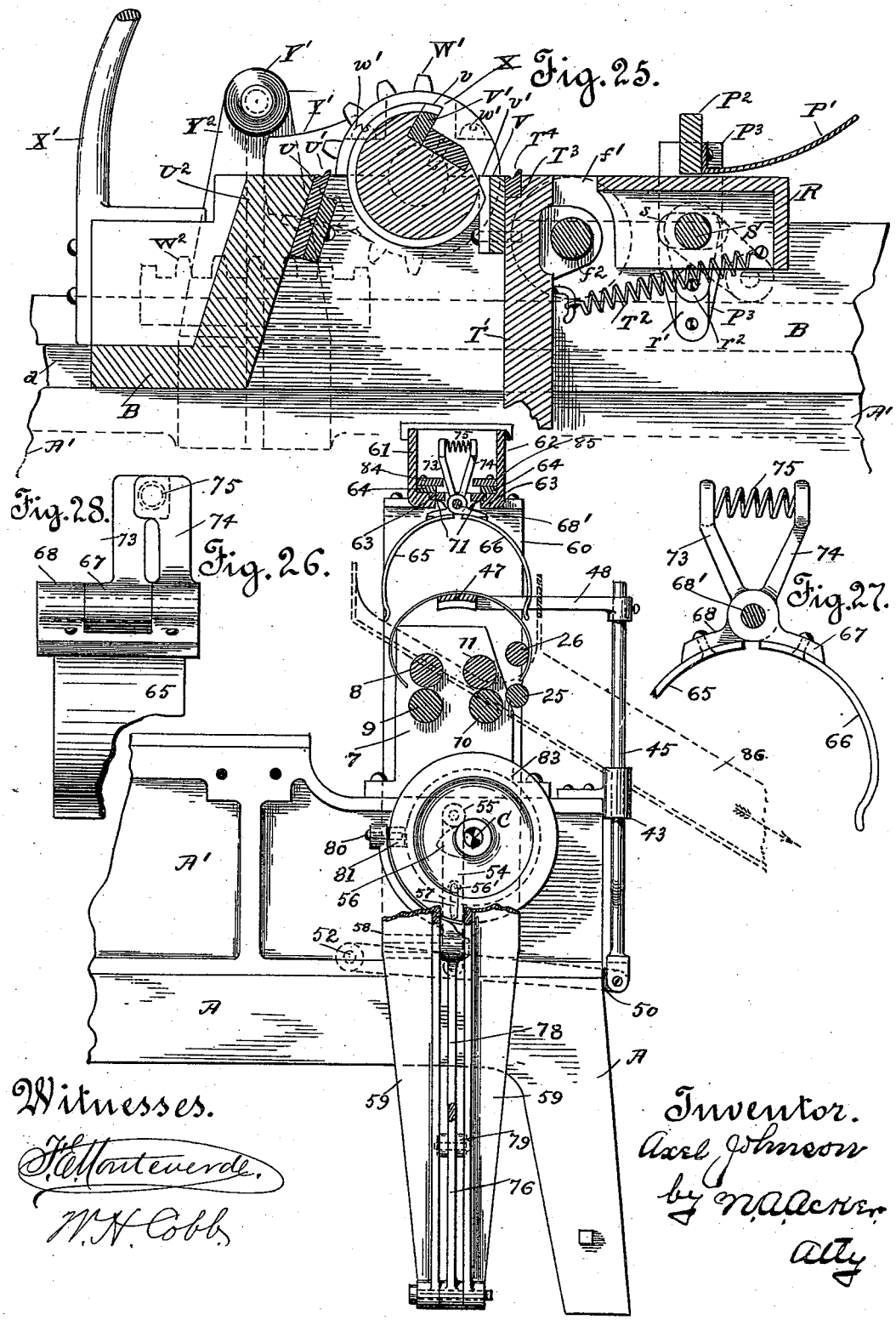

(No Model.) 11 Sheets—Sheet 11.

A. JOHNSON.
CAN BODY BLANK CUTTING MACHINE.

No. 549,725. Patented Nov. 12, 1895.

Witnesses.
F. E. Monteverde
W. H. Cobb

Inventor.
Axel Johnson
by N. A. Acker
Atty

UNITED STATES PATENT OFFICE.

AXEL JOHNSON, OF OAKLAND, ASSIGNOR OF TWO-THIRDS TO CHARLES JOSSELYN AND E. F. PRESTON, OF SAN FRANCISCO, CALIFORNIA.

CAN-BODY-BLANK-CUTTING MACHINE.

SPECIFICATION forming part of Letters Patent No. 549,725, dated November 12, 1895.

Application filed February 21, 1895. Serial No. 539,277. (No model.)

*To all whom it may concern:*

Be it known that I, AXEL JOHNSON, a citizen of the United States, residing at Oakland, in the county of Alameda and State of California, have invented a certain new and useful Can-Body-Blank-Cutting Machine; and I do hereby declare the following to be a full, clear, and exact description of said invention, such as will enable others skilled in the art to which it most nearly appertains to make, use, and practice the same.

This invention relates to a certain new and useful can-body-cutting machine, which consists in the arrangement of parts and details of construction, as will be hereinafter fully set forth in the drawings and described and pointed out in the specification.

The object of the present invention is to provide a machine adapted to trim and cut a number of can-body blanks from a single sheet of metal conveyed therethrough, the machine being more especially designed to cut and form can-body blanks to be used in connection with the can-making machine fully set forth and described in Letters Patent of the Unted States No. 526,925, granted to Johnson and Black October 2, 1894, although the machine may be utilized for the cutting from the sheet of metal passing therethrough any style of a can-body blank.

In order to comprehend my invention, reference must be had to the accompanying sheets of drawings, wherein—

Figure 5:
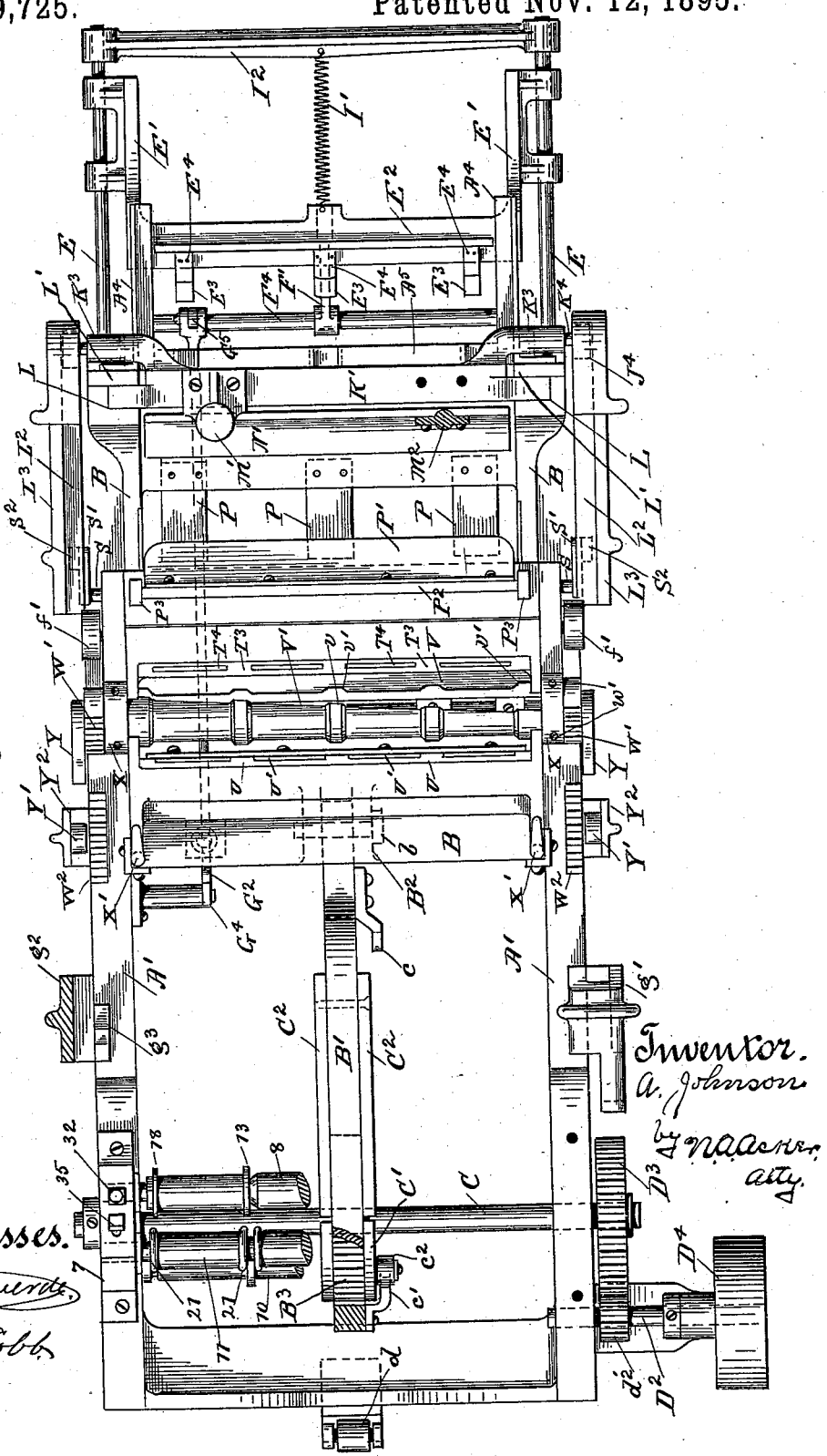
Figure 6:
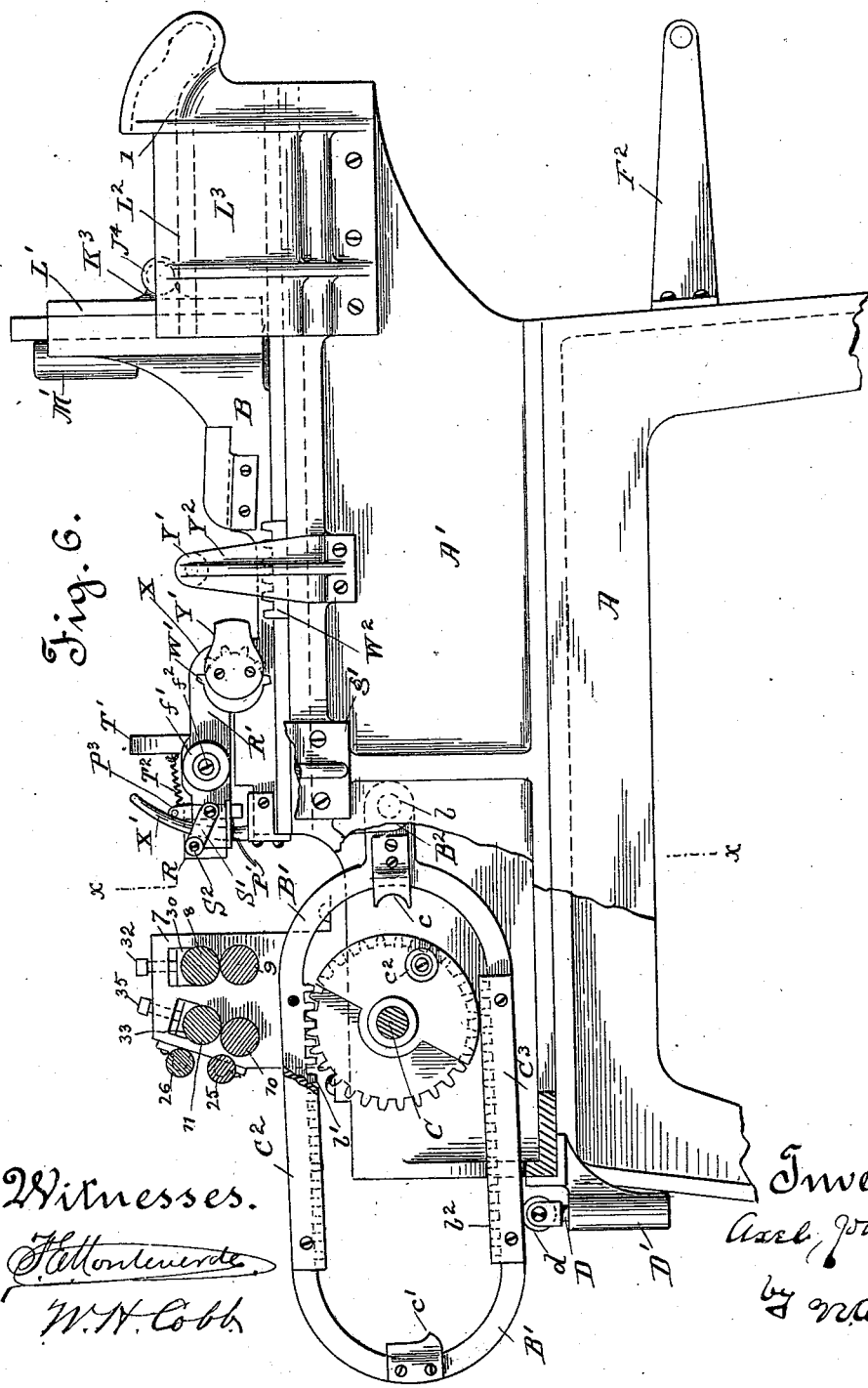
Figure 7:
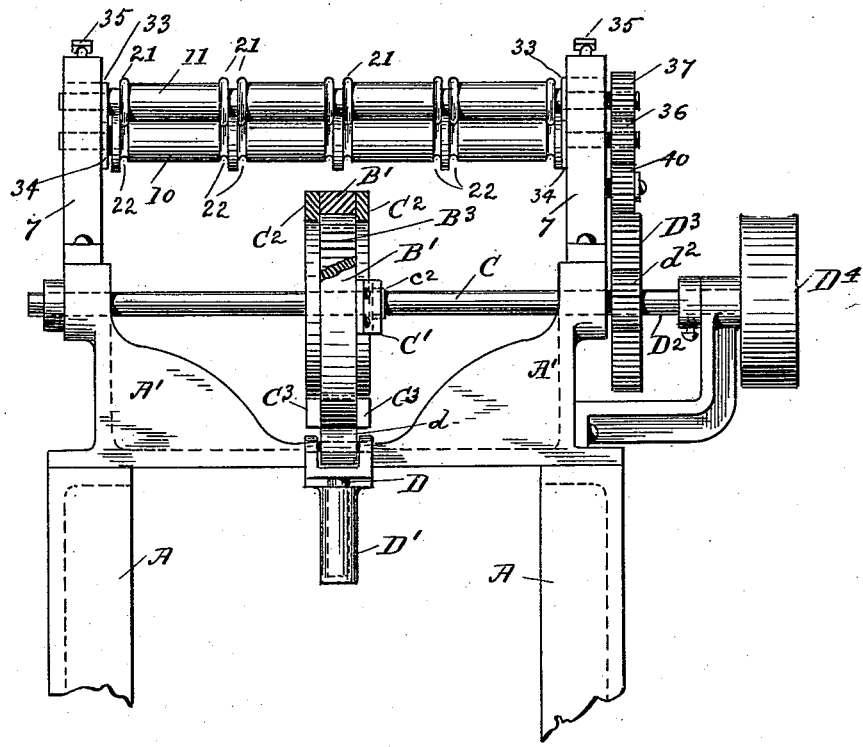
Figure 8:
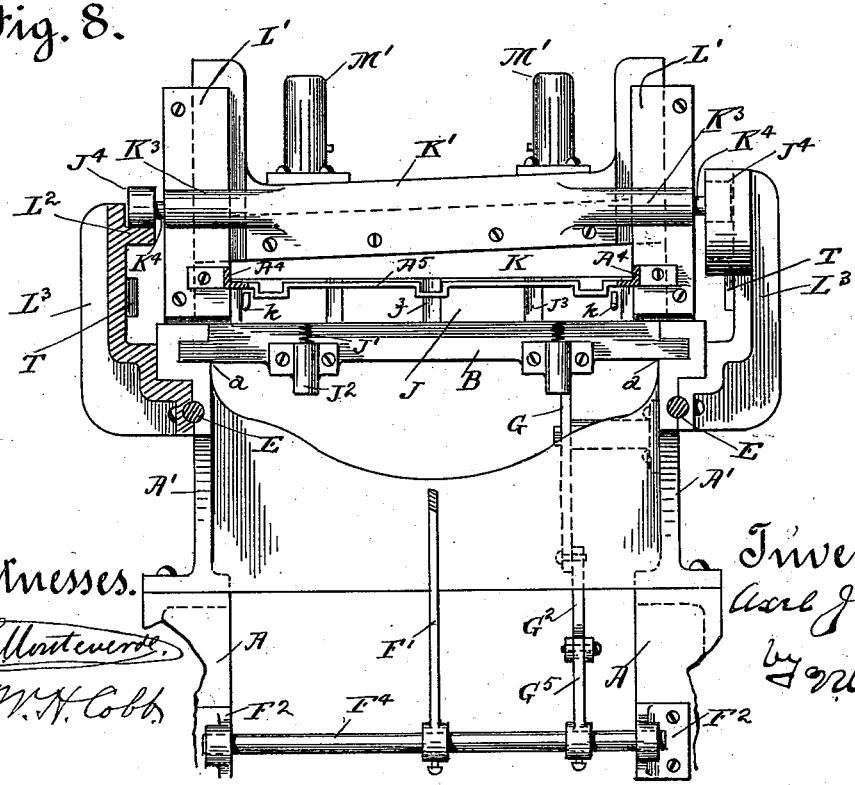
Figure 29:
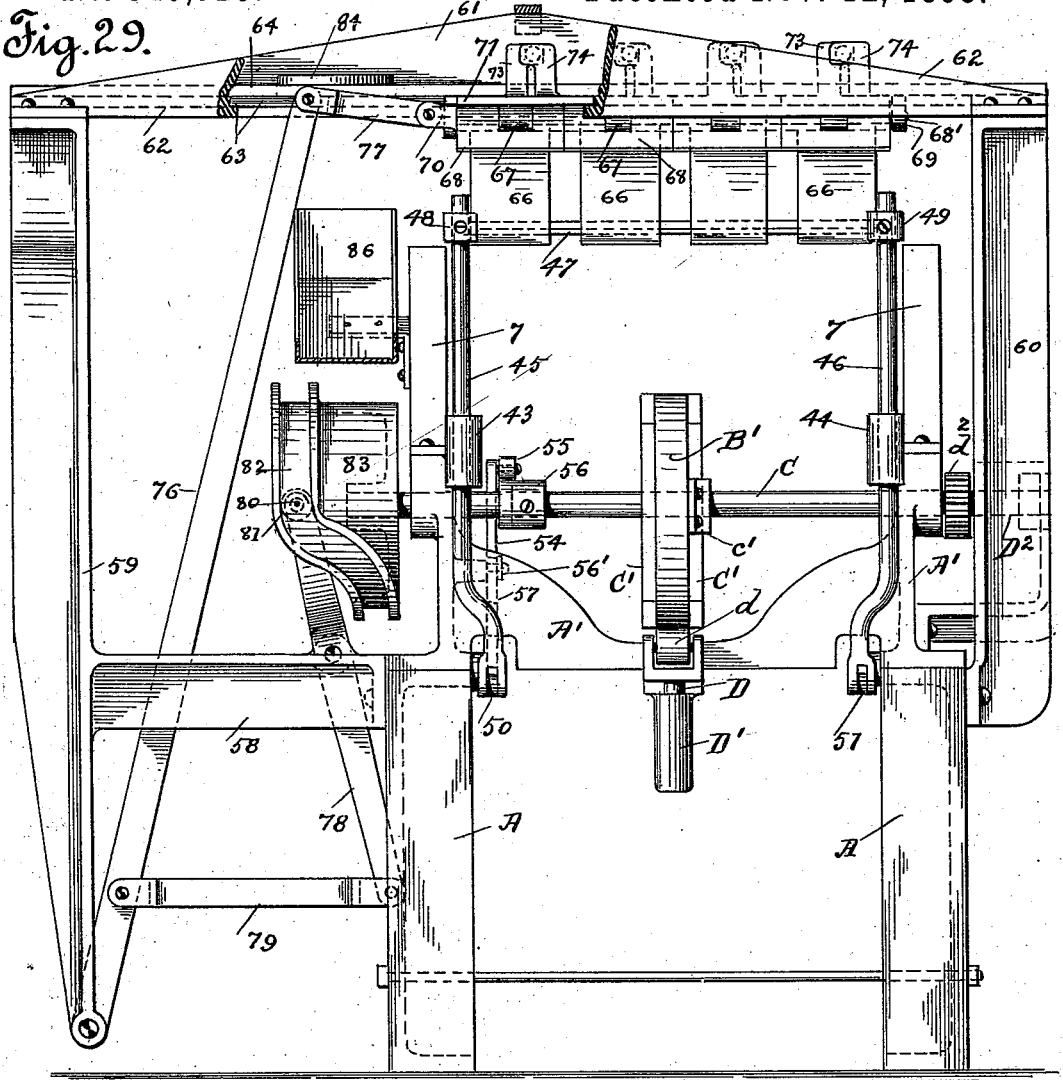
Figure 30:
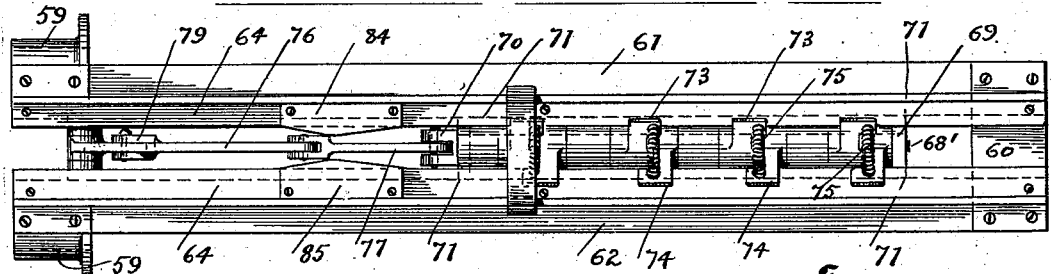

Figure 1 is a view in side elevation of the machine, the delivery end thereof being partly broken away. Fig. 2 is a longitudinal sectional elevation of the mechanism illustrated by Fig. 1. Fig. 3 is a detail end elevation of the trigger-lever. Fig. 4 is an enlarged detail side elevation of trigger-lever, showing actuating-pin and part of reciprocating carriage. Fig. 5 is a top plan view of the mechanism disclosed by Fig. 1, the slitting-rolls and forming-rolls being partly broken away and the extracting mechanism for the formed can-body blanks being removed. Fig. 6 is a side view in elevation of the machine, the extractor mechanism being removed and the delivery end of the machine being partly broken away, the feed mechanism for the blank sheet of metal being likewise removed. Fig. 7 is a rear end elevation of the machine, showing the position of the forming-rolls, the cutting or slitting rolls and the guide-rolls and the extractor mechanism for the can-bodies being removed. Fig. 8 is a front end elevation of the machine with the feeding mechanism for the sheet of metal left out, said view showing the position and arrangement of the first or forward pair of cutting-knives. Fig. 9 is an enlarged detail sectional view showing the position of the swinging frame or cross-head when thrown over or closed. Fig. 10 is a detail top plan view of the mechanism illustrated by Fig. 9. Fig. 11 is a broken end elevation on line $x\ x$, Fig. 6, viewed from the direction of the delivery end of the machine Fig. 12 is a detail side elevation of the sliding frame. Fig. 13 is a cross-sectional view showing position of the forward pair of knives when closed. Fig. 14 is an enlarged sectional detail view showing the relative position of the cutting or slitting rolls, crimping-rolls, and guide-rolls, the body-blank being represented by dotted lines and the travel thereof being indicated by the arrow. Fig. 15 is a front elevation of the can-body cutting or slitting rolls. Fig. 16 is a front detail view, partly broken, of the guide-rolls. Fig. 17 is a broken top plan view showing the position of the cutting or slitting rolls and the forming-rolls. Fig. 18 is an enlarged detail view showing cross-head and upper and lower cutting-knives. Fig. 19 is an enlarged detail top plan view showing lower knife and part of the frame. Fig. 20 is a top plan view showing a sheet of metal after having passed through the cutting-knives, said sheet being shown as being partly cut by the cutting or slitting rolls, the ends being formed into hooks and pockets. Fig. 21 is a longitudinal sectional view of the can-body blank, taken on line $z\ z$, Fig. 20. Fig. 22 is an end view of one of the body-blanks, viewed in direction of arrow 1, Fig. 20. Fig. 23 is a similar view of the body-blank, viewed in direction of arrow 2, Fig. 20. Fig. 24 is an end view of a can-body blank in cross-section after having passed through the forming-rolls of the machine. Fig. 25 is an enlarged detail sectional view showing the position of the swinging frame or cross-head when open or about to receive a sheet of metal, said figure showing the swinging frame or cross-head in a position opposite to that illustrated by Fig. 9. Fig. 26 is a side view in elevation of the delivery end of the machine, showing the mechanism for extracting the formed body-blanks from off the guide-rolls. Fig. 27 is an enlarged detail end elevation of one of the extractor-jaws. Fig. 28 is an enlarged detail front elevation of one of the extractor-jaws. Fig. 29 is an end view of the machine, viewed from the delivery end, said view showing fully the extracting mechanism for the formed body-blanks; and Fig. 30 is a top plan view of the body-blank extracting mechanism.

The letter A indicates the main or supporting frame of my machine, which supporting-frame may be of any suitable style, said frame being cast or provided with the side pieces A'. These side pieces are cast with the guide-grooves $a$, Fig. 8, within which guide-grooves works or slides the reciprocating open carriage B. This carriage has imparted thereto a forward and backward movement or reciprocation through the medium of the double rack-frame B', the forward end of which frame is fulcrumed to the bracket $B^2$, depending from the reciprocating carriage B by means of the pin or bolt $b$. The double rack-frame has a reciprocating motion given thereto by the gear-wheel $B^3$, which wheel is secured to the shaft C, which passes through the main frame of the machine. As the gear-wheel $B^3$ is carried around, the teeth thereof engage with the upper teeth $b'$ of the double rack-frame during one-half of its rotation and draw the rack-frame forward and engage with the lower teeth $b^2$ of the rack-frame during the remaining portion of its rotation, so as to cause the rearward movement of the said frame, the reciprocation of which rack-frame imparts a corresponding movement to the carriage B.

In order that the gear-wheel $B^3$ shall only engage the teeth of the rack-frame during a half-rotation, I place over one-half of the gear-wheel the semicircular plate C', the periphery of which plate comes flush with the outer edge of the covered gear-teeth. The periphery of this plate C' engages the lower face of the plate $C^2$, while the teeth of the gear-wheel engage with the lower rack-teeth $b^2$ of the rack-frame. The lower edge or face of the plate $C^2$, which plate is bolted to the side of the rack-frame and extends the full distance of the rack-teeth, comes flush with the lower edge of the rack-teeth $b'$. Consequently, the moment the said semicircular plate engages the surface of the plate $C^2$ the rack-frame will be raised or swung upward upon its fulcrumed point or pin $b$, which removes the rack-teeth $b'$ from engagement with the teeth of the gear-wheel $B^3$ and causes the lower rack-teeth $b^2$ to move into mesh with the teeth of the said gear-wheel. After the rack-frame has traveled its full inward distance or toward the feed end of the machine, Fig. 2, the exposed teeth of the gear-wheel engage the upper teeth of the rack-frame and cause the rack-frame to move outward or toward the delivery end of the machine. The upper teeth of the rack-frame are thrown into mesh with the teeth of the gear-wheel $B^3$ by the semicircular plate engaging with the upper surface of the plate $C^3$, bolted to the side of the lower member of the double rack-frame, which causes the fulcrumed rack-frame to move downward, causing the lower teeth of the rack-frame to move out of engagement with the teeth of the gear-wheel and throwing the upper teeth of the rack-frame into mesh therewith.

In order to assist in moving the fulcrumed rack-frame up and down, so as to throw the upper or lower teeth of the rack-frame into mesh with the gear-wheel, I secure at each end of the frame a projecting stud $c$ $c'$, which studs are engaged by the roll $c^2$, secured to the semicircular plate of the gear-wheel $B^3$. This roll engages with the stud $c$ when the rack-frame has moved its full outward distance and assists in throwing the rack-frame upward, so as to place the lower teeth $b^2$ into mesh with the teeth of the gear-wheel, and it engages with the stud $c'$ when the rack-frame has moved its full inward distance and assists in throwing the lower teeth of the rack-frame into mesh with the teeth of the gear-wheel. The rack-frame is thus reciprocated back and forth by the continuous rotary travel of the gear-wheel.

The weight of the rack-frame is counterbalanced and the outer end thereof prevented from dropping downward as the said rack-frame is moved beyond the main frame of the machine by means of the supporting-roll $d$, secured to the rod D, which rod works within the thimble D', bolted to the rear or delivery end of the machine, Figs. 2 and 6. The rod D is held upward by the spring $d'$, located within the thimble D'. This supporting-roll $d$, being spring-actuated, assists the rack-frame to swing upon its fulcrumed point.

Motion is imparted to the shaft C, which carries the gear-wheel $B^3$, by the shaft $D^2$, the motion of which is imparted to the shaft C through the medium of the pinion $d^2$, secured to the shaft $D^2$, engaging with the gear-wheel $D^3$, secured to the projecting end of the shaft C. The shaft $D^2$ is driven by the drive-wheel $D^4$, secured to the end of said shaft.

From the feed end of the machine project the rods E, upon which work the slide-plates E', which plates are connected by the cross-piece $E^2$. From this cross-piece or plate project the supporting-strips $E^3$ and elastic clip-pieces $E^4$. The slide-plates and cross-piece or plate may be said to constitute the reciprocating feed-bed for the blank sheets of metal. This feed-bed is moved in and out or toward and from the machine by the movement of the reciprocating carriage B.

To the brackets F, depending from the cross-piece $E^2$ of the feed-bed, is secured the upper end of connecting-rod F', the lower end of which is secured to the cross-shaft $F^4$, which connects the ends of the brackets $F^2$, which project from the main frame, Figs. 1 and 2. The connecting-rod F' is secured to the trigger-lever G, fulcrumed to a rod or shaft G', projecting from the inner face of one of the side pieces of the main frame below the reciprocating carriage B, by the rod $G^2$. The outer end of this rod is connected to the upper end of the short lever $G^5$, projecting from the cross-shaft $F^4$, by the pin $G^3$, and the inner end to the trigger-lever G by pin $G^4$, Figs. 2, 3, and 4. The upper end of the trigger-lever G is engaged by the pin H, which works within the thimble H', secured to the under face of the reciprocating carriage B, Fig. 4. This pin is normally held outward by the resiliency of spring $H^2$, secured within the thimble, and the pin H is prevented from falling out of the thimble by means of the cross-pin $h$, which works within an elongated slot $h'$, cut within the thimble H'. As the reciprocating carriage is carried inward or toward the delivery end of the machine by the hereinbefore-described mechanism, the pin H rides upon the inclined upper end of the trigger-lever G, Fig. 4. The pin while riding upon the inclined end of the trigger-lever moves upward within the thimble H'. The moment the pin has passed beyond the inner edge of the trigger-lever the pressure of the retained spring forces the said pin below the face of the lever. Now as the reciprocating carriage is moved outward or toward the feed end of the machine the depending pin H engages the edge of the trigger-lever and, having no inclined face to ride upon, draws the said lever over toward the feed end of the machine, which causes the lower end of the lever to move inward, carrying therewith the rod $G^2$, which throws the upper end of the connecting-rod inward, causing the feed-bed to move toward the machine. The moment the pin H is carried outward such a distance as to move from engagement with the trigger-lever said lever will be drawn into its vertical position by the spring I, which connects the lower end of the said lever to the main frame of the machine, Fig. 2, while the feed-bed will be drawn outward by means of the spring I', which forms a connection between the cross-piece $E^2$ and the cross-rod $I^2$, which connects the ends of the rods E and forms a stop for the outward movement of the slide-plates E', Fig. 5.

At the front of the reciprocating carriage B, (or feed end of the machine,) I secure the lower cutting-knife J, held in place by the projections or lugs $j$, fitting within the dovetailed guide-grooves $j'$, cut in the face of the front or outer end of the said carriage, Fig. 19. The knife J is held upward by the springs J', which springs are held in thimble $J^2$, secured to the front edge of the carriage B, Figs. 8 and 18. This knife has the grooves $J^3$ cut in the face thereof, into which fit the lips of the upper or male knife. Above the knife is located the upper or male knife K, which knife is bolted or otherwise secured to the cross-head K'. This knife is provided with the cutting-lips $K^2$, which fit within the grooves $J^3$, cut in the face of the lower or female knife.

The outer ends of the cross-head K' fit and move or slide within the vertical guide-grooves L, formed by channeling away the inner face of the forward ends of the reciprocating carriage and securing to the said the forward ends the face-plates L', Figs. 5 and 8. From the front of the cross-head K' project the brackets $K^3$, which hold in place the shafts $K^4$, to the outer end of which I secure the rolls $J^4$, which rolls rest or bear upon the track $L^2$ of the cam-plates $L^3$, which plates are fastened to the main frame, Figs. 1, 2, 6, and 8. The track or support $L^2$ gradually curves downward from the point $l$ until the forward end of the cam-plate $L^3$ is reached, as shown in dotted lines, Figs. 1 and 6, and the cam-plate is provided with an inwardly-projecting flange at this portion of the track or support, so as to provide an inclined groove in the cam-plate for rolls $J^4$ to travel within. As long as the rolls $J^4$ travel over the straight portion of the track $L^2$, the upper or male cutting-knife will be held away or above the lower knife; but when the rolls enter the downwardly-inclined portion of the supporting-tracks the upper or male cutting-knife will gradually lower or move downward until the rolls $J^4$ reach the lowest portion of the inclined groove, which will be when the reciprocating carriage has moved its full outward distance. As the reciprocating carriage is carried inward, the cross-head carrying the upper or male cutting-knife is gradually raised by the rolls $J^4$, traveling up the inclined track. The cutting edge or face of the upper or male knife is made at an incline, so as to act as a cutting-shear when brought down against the lower knife.

To the top of the vertically-movable cross-head K', I bolt the brackets M, which carry the hollow standards M', the two being preferably made in one casting. These standards project downward against the inner face of the cross-head, and within the same work the stems or rods $M^2$, which rods are prevented from dropping from within the standards by means of the pins $M^3$, which work within the elongated slot $M^4$ of the standards, Fig. 18. By means of the springs N, located within the hollow standards, the rods $M^2$ are maintained outward. These rods have secured to their lower end the inclined clamp-plate N', which plate, when the cross-head K' has been lowered so as to cause the upper knife to cut the sheet of metal, bears upon the inclined shouldered portion $N^2$ of the reciprocating carriage and holds the outer end of the sheet of metal tightly clamped, while the edge projecting beyond the face of the inclined shoulder $N^2$ is bent or turned down so as to make the hook $p$, Fig. 21, as will be hereinafter fully set forth.

To the flange $n$, inwardly projecting from the front end of the reciprocating carriage, are secured the plates P, which support the sheet of metal as fed into the machine and guide its forward end beneath the guide-plate P'. This guide-plate is secured to what I term the "presser-bar" $P^2$, which bar extends transverse of the machine, and at its ends is connected to the head-blocks $P^3$. These blocks work up and down, so as to raise and lower the presser-bar $P^2$ between guides $p'$ $p^2$ of the movable frame R, which frame slides in and out within the grooves $r$ of the swinging frame R'. The presser-bar is raised and lowered by the rotatable shaft S, which shaft passes through the swinging frame R', Figs. 10 and 11, and works within the elongated slots $s$, cut within the sides of slide-frame R, and the elongated slots $s'$, cut within the head-blocks $P^3$. This shaft S is connected to the head-blocks $P^3$ by toggle-levers $r^2$ $r'$, which levers are connected together, as shown, and to the shaft S and head-blocks, respectively.

To the projecting end of the rotatable shaft S is fastened the crank-arms S', to the outer end of which arms I secure the rolls $S^2$. These rolls, as the reciprocating carriage moves forward or toward the feed end of the machine, travel beneath the inclined fixed cams T, bolted to the side piece of the machine, which cams throw the rolls $S^2$ and crank-arms downward. This movement of the crank-arms throws over or oscillates the rotatable shaft S, which causes the toggle-lever to draw the head-blocks $P^3$ downward and force the presser-bar tightly against the face of the slide-frame R, Fig. 25. The presser-bar is raised as the rolls $S^2$ are carried beneath a second inclined cam located at the opposite end of the machine, as will be hereinafter fully explained.

The slide-frame R is connected to the strengthening rib or plate T' of the swinging frame by means of the springs $T^2$, which springs serve to keep the slide-frame firmly in place and prevent the same moving in and out with a jolt.

To the upper inner edge of the strengthening plate or rib T' is secured the cross-plate $T^3$, which plate is provided with a series of projecting male dies $T^4$, which project above the surface of the strengthening-plate. These dies or the die-plate are carried over with the swinging frame and fit within the female dies U of the die-plate U', secured to the rib $U^2$ of the reciprocating carriage, when the swinging frame has been swung over its full distance, Figs. 2, 9, and 25.

In front of the die-plate $T^3$ is secured the cutting blade or knife V, which knife, as the swinging frame is carried or swung over, registers with the cutting-edge of the circular knife V'. This circular cutting-knife is provided with the raised beads or ribs $v$, which fit within the grooves $v'$ of the cutting-knife V as the swinging frame is carried over. The circular cutting-knife is provided with square shoulders, which fit within seats cut within the sides of the reciprocating carriage, and said knife is held rigidly in place by the screw-bolt $w$, which passes through the frame of the reciprocating carriage into the said knife. The ends of the square shoulders of the cutting-knife terminate in rounded journals, which project beyond the sides of the reciprocating carriage, and upon these rounded ends or journals I loosely secure the bearing-boxes X—one for each journal—to which the swinging frame is secured by bolts $w'$. These bearing-boxes constitute a part of the swinging frame, and to the outer face of each bearing-box is secured the mutilated gear W'. The teeth of these gears engage with the teeth of the rack-bars $W^2$, secured to each side piece of the main frame, as the reciprocating carriage is carried back and forth and turn the swinging frame over.

In order to assist in the throwing over of the swinging frame, so that the entire strain thereof will not fall upon the teeth of the mutilated gears and rack-bars, I provide the cam-levers Y, which levers are fastened to the face of the gears W'. The ends of these cam-levers project beyond the face of the mutilated gears and move under the rolls Y', supported by brackets $Y^2$ above the main frame. As the cam-levers pass under the rolls Y', the levers are thrown downward, which partially raises the swinging frame, after which the said frame is thrown completely over by the gears engaging the rack-plates, Fig. 25.

At the inner end of the reciprocating carriage I secure the upwardly-curved horns X', which horns, as the swinging frame is swung over, pass through the openings $f$, cut through the cross-piece of the slide-frame. As the swinging frame is carried its full distance over, the horns, projecting upwardly upon a curve, draw the sliding frame outward a slight distance, so as to draw the cut edge of the metal plate from beneath the cutting-knife V and place same over the die U, in order that the die $T^3$ when pressed down may form a pocket in that edge of the sheet to receive the hook or flange formed upon the opposite edge or end when the can-body is formed. The die $T^3$ is pressed firmly down by the rolls $f'$, secured upon projecting end of shaft $f^2$, which shaft passes through the swinging frame, Fig. 10, moving under the inclined portion $g$ of the cam-plates $g'$ $g^2$, secured to and projecting above each side of the main frame of the machine, Figs. 1, 2, and 5. As the rolls $f'$ travel beneath the inclined portion of the cam-plates, the inner end of the swinging frame (or that portion nearest the circular-shaped cutting-knife V') is forced downward, the movement of which causes the male die to press firmly upon the female die.

In order that my machine, as thus described, may be fully understood, the operation of the several parts as a sheet of metal is passed or conveyed through will now be set forth.

Presuming, for the purpose of illustration, the carriage to be upon its return or outward stroke or toward the feed end of the machine, the sheet of metal from which the can-body blanks are to be cut and formed is placed upon the reciprocating feed bed or carriage, the outer end thereof being held beneath the clips E⁴ and plates E³. When the reciprocating carriage has moved outward such a distance as to cause the stud or pin H to engage with the trigger-lever G, the reciprocating bed will be thrown inward, through the medium of the before-described connecting-rods, toward the outwardly-traveling carriage. As the carriage continues its outward movement, the sheet of metal will slide upon the supporting-bars A⁴, projecting forwardly from the cross-plate A⁵, secured to the forward end of the reciprocating carriage, Figs. 1 and 2, and be carried inward between the forward cutting-knives until the inner end rests upon the edge of the cutting-knife V, the sheet as carried inward moving beneath the presser-bar P². By the time the sheet of metal has moved inward this distance the rolls S² will have traveled beneath the inclined cams T and the presser-bar brought down, so as to clamp the sheet of metal firmly. As the rolls J⁴ of the cross-head K, carried by the reciprocating carriage, move within inclined grooved portions of the plates L³, the cross-head K' will be gradually lowered, the movement of which cross-head carries the cutting-knife K therewith, which knife, acting in conjunction with the knife J, shears or trims the outer end of the sheet of metal, the lip or bead K² of the said cutting-knife K registering with the grooves J³ in the stationary cutting-knife J. This lip or bead K² cuts away the metal, as shown at 3, Fig. 20. As the reciprocating carriage moves its full outward distance, the cutting-knife K is carried below the face of the knife J, and in its outward movement contacts with the pins or studs k, outwardly projecting from the knife or blade J, and forces the cutting-knife J downward below the edge of the inclined shoulder N². Inasmuch as the face of the plate N' and shoulder N² is inclined, it is obvious that as the outer end portion of the sheet of metal is pressed down upon the face of the inclined shoulder the same will be buckled or curved downward, the buckling or curving of which will draw the cut edge slightly inward or beyond the edge of the cutting-knife J. The cut edge of the sheet of metal will thus be left overlying the edge of the inclined shoulder N². The continued downward movement of the cross-head K' causes the shoulder k' of the cutting-knife K to bear upon the cut edge of the sheet of metal projecting beyond the edge of the inclined shoulder N² and bend or turn the end downward, so as to provide the hook or flange p, Fig. 21. After this hook or flange has been formed the reciprocating carriage begins to move inward and the cross-head K' and clamp-plate N' to gradually lift or rise. As the reciprocating carriage continues its inward travel with the sheet of metal held firmly down at its inner end portion by the presser bar or plate P², the cam-plates Y move under the rolls Y', Fig. 1, and partially turn the swinging frame R', after which the said frame is entirely thrown or swung over by the mutilated gears W' engaging the teeth of the rack-plates secured to the sides of the main frame. During the swinging movement of the said frame R' as the reciprocating carriage continues its inward travel the inner end of the sheet of metal, which rests upon the knife V, is carried against the cutting-edge of the circular knife V', which trims this end of the sheet as the swinging frame continues to turn over. In this cut of the sheet of metal the ribs or beads v, which register with the grooves v' of the cutting-knife V, cut away the sheet, as shown at 4, Fig. 20. After this edge of the sheet of metal has been properly cut and trimmed, the horns X' pass through the openings of the slide-frame R as the frame R' continues to swing over to a horizontal position and gradually draw the slide-frame from within the swinging frame a short distance. This outward movement of the slide-frame is sufficient to draw the cut sheet of metal held against the sliding frame by the presser bar or plate P² away from the cutting-knife V and place the cut edge or end thereof over the die U. By this time the swinging frame will have been thrown into a horizontal position or made its full swing, and the die T⁴ will rest upon the edge of the sheet directly over the die U. After the swinging frame has been thrown into this position, the reciprocating carriage continues its inward travel for a short distance, during the movement of which the rolls f' move or travel beneath the inclined portion g of the cam-plates g' g² and force the inner end of the swinging frame firmly down, which causes the male die T⁴ to bear firmly upon the edge of the sheet resting upon the female die U, which forms the pockets 5, Fig. 21, within which the hook or flange p fits when the can-body is formed. The moment the rolls f' have traveled beyond the inner end of the inclined portion g of the cam-plates g' g² they travel or ride upon the lower inclined portion or shoulder g³, which causes the rolls to rise and lift the inner end of the swinging frame, so as to lift the male die from engagement with the female die. The continued inward movement of the reciprocating carriage carries the rolls S² beneath the inclined cam-bracket g⁴, secured to the cam-plate g², which forces the crank arms S' downward, the movement of which imparts an opposite oscillation to the shaft S to that given by the rolls S², moving beneath the cam-plates T at the forward end of the machine, and serves to raise the presser bar or plate P² through the toggle-levers $r^2\ r'$, so as to release the sheet of metal held thereby. As the presser bar or plate is raised to release the sheet of metal, the reciprocating carriage will have traveled inward such a distance as to place the inner end of the sheet of metal between the slitting-rolls of the machine, by means of which rolls the sheet of metal is carried toward the discharge end of the machine, and while passing through the rolls is cut or slit into proper body-blanks. During the outward travel or movement of the reciprocating carriage, or toward the feed end of the machine to receive another sheet of metal, the operation of the several parts is the reverse to that just described.

Near the rear or discharge end of the machine I bolt or otherwise secure to the sides of the main frame the upwardly-projecting side pieces or plates 7, between which plates I locate the slitting-rolls 8 9, one above the other. Between the rolls the inner end of the cut sheet of metal is received upon the full inward movement of the reciprocating carriage, as before described. As these rolls are rotated or carried around, the sheet of metal is drawn from the said reciprocating carriage and conveyed between the rolls to the forming-rolls 10 11, located a short distance behind the slitting-rolls. The rolls 8 9 are provided with a series of circular cutting knives or collars 12 13, which circular cutting-knives, as the sheet of metal passes between the said rolls, slit or cut the metal plate longitudinally, so as to cut the sheet of metal into a number of can-body blanks $1'\ 1^a\ 1^b\ 1^c$, Fig. 20. The upper slitting-roll 8 is provided with the longitudinal groove 14, which receives the hook or flange $p$ of the sheet of metal, so as to prevent the same being mashed down while the sheet is passing through the rolls; and the said roll is also provided with the longitudinal groove 15, which registers with the longitudinal groove 16 of the roll 9 as the rolls are rotated. These two grooves receive the pocket end 5 of the can-body blanks as they pass through the rolls. In view of the fact that the sheet of metal is slightly wider than is required to give, say, four blanks, there will be a small waste of the sheet at each side. These waste strips, as the sheet of metal is passed through the rolls 8 9, are prevented from clogging in the machine by the stripper-plates 17, secured to the inner face of each plate 7. These stripper-plates embrace the circular cutting-knife 18 of the roll 8, Fig. 17, and deflect the waste strips and cause the same to fall through the frame of the machine to the floor. The cut body-blanks as passed from between the slitting-rolls are placed between the forming-rolls 10 11 by the guide-plate 19, secured between the plates 7. As the can-body blanks enter between these rolls, the hook or flange $p$ fits within the longitudinal groove 20 of the roll 11. The roll 11 is also provided with a series of circular beads or lips 21, which, as the can-body blanks are conveyed through the rolls, press the sides of each can-body blank into the circular grooves 22 of the roll 10, so as to form the side grooves 22, Figs. 22 and 23, in the body-blanks, which grooves receive and hold the ends of the can while the body-blank is being formed or rolled into a can-body. The pocket end 5 of the body-blanks fits within the longitudinal grooves 23 24 cut within the rolls 10 and 11.

The cut can-body blanks, as delivered from between the forming-rolls 10 and 11, strike the guide-roll 25 and are thrown or curled upward over the roll 26, located above the guide-roll 25. These rolls are journaled in bearing-boxes 27 28, secured to the discharge end of the main frame of the machine.

The travel of the sheet of metal 29 through the slitting and forming rolls is indicated by arrow, Fig. 14.

Slitting-rolls 8 and 9 are journaled in bearing-boxes 30 31, secured in the side plates 7, the bearing-boxes 30 being adjustable, in order to raise and lower the upper slitting-roll by means of the adjusting-screws 32, Figs. 14 and 15. Forming-rolls 10 and 11 are journaled in bearing-boxes 33 34, secured in the side pieces or plates 7, and the bearing-boxes of roll 11, like slitting-roll 8, are adjustable by means of the adjusting-screws 35.

To the projecting end of the rolls 10, 11, 9, and 8, I secure, respectively, the gears 36 37 38 39, the former two of which intermesh with one another. The gear 36, which drives gear 37, receives its motion from gear-wheel $D^3$, through the medium of pinion 40, while the gear 38, which intermeshes with and imparts motion to gear 39, derives its motion from gear 36, through the medium of pinion 41, Fig. 1.

At the discharge or inner end of the machine I secure to the side pieces of the main frame the guides 43 44, Fig. 29, through which work the rods 45 46. From these rods forwardly project the arms 48 49, which arms are connected by the cross-plate 47. The arms 48 49 project forward such a distance as to cause the cross-plate 47 to stand above the roll 11, Fig. 26. As the can-body blanks are forced from between the forming-rolls, they are guided by the guide-roll 25 over the roll 26. The curvature or curl of the metal causes the body-blanks, when finally discharged through the machine, to lie over the cross-plate 47, Fig. 26. Lower end of the rods 45 46 I connect to the inner end of the levers 50 51, respectively, the outer end of each lever being fulcrumed to the side pieces of the main frame by pins 52 53. From the fulcrumed lever 50 upwardly extends the rod 54, to the upper end of which rod I secure the roll 55, which roll is engaged by the cam 56, secured to the cross-shaft C, during the rotation of the shaft C. As the said cam engages with the roll 55, the rod 54 is drawn or forced upward, the movement of which rod causes the outer end of the fulcrumed lever to be elevated, which lifts the rods 45 46 and raises the cross plate or bar 47, secured to the arms 48 49. As this cross plate or bar is moved vertically, the cut and formed can-body blanks curled thereover are raised from off the forming and guide rolls and placed within the hereinafter-described extracting-jaws.

In order to maintain the rod 54 in a true vertical position, I secure the same to one of the side pieces A', Fig. 29, by the stud 56', which plays within the elongated slot 57, cut in said rod 54.

From one side of the main frame of the machine, at its delivery end, is bolted the laterally-projecting bracket 58, to which bracket is cast or secured the vertical standard 59. To the opposite side of the main frame is bolted the vertical standard 60, which standard is coextensive in height with the standard 59. These standards are connected by the cross-plates 61 62, located a short distance apart, so as to leave a space between which the upper end of the clamping-jaws hereinafter described work.

The cross-plates 61 62 are provided with the channel-flange 63, and to the upper face of the said flange of each cross-plate is secured the guide-plate 64, which forms the guide-groove within which works or slides the clamping-jaw for the can-body blanks.

A short distance above the cross plate or rod 47 I locate the extracting or clamping jaws, each jaw consisting of the sections 65 66, the jaw-section 66 being provided with the male section 67 of a hinged joint. These jaw-sections of the clamp-jaws swing upon what I term the "plunger-rod" 68', which rod passes through the male and female section, Figs. 26, 27, and 29, and to the inner end of which plunger-rod 68' is secured the nut 69, which holds the rod in place. The outer end of the rod is provided with the enlarged shoulder or head 70. This head and the nut 69 is formed with projecting shoulders 71, which slide within the channel or guide groove of the cross-plates 61 62. Each section of the clamping-jaw is provided with an upwardly-projecting arm 73 74, Figs. 26 and 27, which arms are held apart by the spring 75.

The outer end of the plunger-rod is connected to the upper end of the vertical rod 76 by the connecting-rod 77, Fig. 29. Lower end of the vertical rod is fulcrumed to the foot or base of the standard 59. This fulcrumed or vertical rod is connected to the lower end of the fulcrumed lever 78 by connecting-rod 79. The lever 78 is fulcrumed to the bracket 58, and from the upper end thereof projects the pin or stud 80, to which is secured the roll 81. This roll works within the eccentric groove 82, cut in the periphery of the cam 83, secured to the opposite end of the shaft C, to which the gear $D^3$ is secured. As the cam 83 is carried around, the roll 81, working within the eccentric groove 82, causes the fulcrumed lever 78 to move in and out, which imparts a similar movement to the vertical rod 76 and causes the plunger-rod to be thrown back and forth. As the cross-rod 47 is raised by the upward movement of the rods 45 46, as before described, the cut can-body blanks are placed between the hinged sections of the clamping-jaw, the body-blanks being held therein by the spring of the metal itself. The moment the cross-bar of the plate 47 has moved downward below the edge of the clamping-jaws, after having placed the cut can-body blanks therein, the plunger-rod begins to travel outward. As the plunger-rod is carried outward, the projecting arms of the clamping-jaws move between the inclined face of the cam-plates 84 85. As the arms move between these inclined cam-plates, they are forced together, the inward movement of which arms opens the sections of the clamping-jaws, so as to permit the body-blank to drop therefrom. The can-body blanks, as delivered from the clamping-jaws, fall into the discharge-chute 86 secured to one side of the machine, Fig. 29, by means of which chute the can-body blanks are conveyed to the can-making machine. (Not shown.)

By reference to Fig. 29 it will be observed that I provide the machine with four clamping or extracting jaws—one for each cut body-blank discharged from the machine. Inasmuch as the clamping-jaws are carried by the plunger-rod 69 it is obvious that as the said plunger-rod is moved outward the clamping-jaws will be opened successively, so as to discharge the cut can-body blanks into the discharge-chute one after the other.

While in the present machine I have described mechanism for cutting and forming can-body blanks for use in connection with the can-making machine secured to Johnson and Black by Letters Patent No. 526,925, granted October 2, 1894, I do not wish to be understood as confining myself to a machine adapted to cut and form this style of a can-body blank solely, for I am well aware that any shaped cutting-knives may be used in my machine and that the dies for forming the hooked and pocketed ends of the sheet may be omitted, if it is desired to form any other style of can-body blanks. The guide and forming rolls may be dispensed with, in case it is desired to cut the can-body blanks to be used in the manufacture of can-bodies having a lap-joint.

An ordinary sheet of metal is in size about fourteen inches by twenty inches, and from each sheet of metal four can-body blanks are cut, the sheet of metal being first properly trimmed. By my machine the sheet of metal is trimmed and cut into proper sized and shaped can-body blanks as it is passed therethrough, the can-body blanks being discharged from the machine in condition to be immediately conveyed to the can-making or the can-body seaming-machine.

Having thus described my invention, what I claim as new, and desire to secure by Letters Patent, is—

1. In a machine for trimming sheets of metal and cutting same into proper size can-body blanks, the combination with the cutting knives for cutting and trimming the ends of the sheet of metal, mechanism for receiving the sheet of metal and placing same in line with the cutting knives, the longitudinal reciprocating carriage which receives the sheet of metal from the feed mechanism, devices for operating the cutting knives with the movement of the said carriage, and devices for receiving the cut sheet of metal from the carriage and trimming the sides of the sheet of metal and slitting same into can-body blanks.

2. In a machine for cutting can-body blanks, the combination with the reciprocating feed mechanism for the sheet of metal, the cutting knives, the longitudinally-reciprocating carriage which receives the sheet of metal from the feed mechanism devices for operating the cutting knives with the movement of the carriage so as to trim the ends of the sheet, the slitting rolls which receive the sheet of metal after the ends have been cut and trim the sides and slit the sheet of metal into proper can-body blanks and the forming rolls which receive and form can-body blanks.

3. In a machine for cutting can-body blanks, the combination with the reciprocating carriage, the cutting knives operated to cut the sheet of metal by the movement of such carriage, the reciprocating feed bed which receives the sheet of metal and places the same in line with the cutting knives and the device for slitting the sheet of metal into can-body blanks.

4. In a machine for cutting can-body blanks, the combination with the feed mechanism for the sheet metal, the mechanism for cutting the ends of the sheet, device for forming a pocket at one end of the cut sheet of metal and a hook or flange at the other end which fits within the pocket when the can body is formed and mechanism for slitting the cut sheet of metal into can-body blanks.

5. In a machine for cutting can-body blanks, the combination with the open reciprocating carriage, the reciprocating feed mechanism for the sheets of metal, the cutting knives secured to the forward end of the reciprocating carriage, the fixed curved cutting knife secured within the reciprocating carriage, a swinging device carrying a cutting knife secured to and working within the open portion of the reciprocating carriage which receives and holds the sheet of metal while the ends are being trimmed by the cutting knives, mechanism for throwing the swinging sheet-carrying frame over during the movement of the reciprocating carriage, devices for forming a hook or flange at one end of the sheet of metal and a pocket at the opposite end of the sheet of metal during its movement through the machine, the slitting rolls for cutting the sheet of metal in a series of body blanks and the forming rolls which receive the body blanks from the slitting rolls.

6. In a can body blank cutting machine, the combination with the reciprocating carriage, the feed mechanism for supplying sheets of metal to the machine, the cutting knives located at the forward end of the reciprocating carriage, the swinging sheet carrying frame secured to and carried by the reciprocating carriage, the cutting knife secured to the inner end of the swinging sheet-carrying frame, the fixed cutting knife secured within the reciprocating carriage with which the cutting knife of the swinging sheet carrying frame registers as swung over and devices for receiving the sheet of metal after the ends have been cut and slitting the same into can-body blanks.

7. In a can-body blank cutting machine, the combination with the reciprocating carriage, the cutting knives, the feed mechanism for supplying sheets of metal to the machine, the swinging sheet carrying frame secured to the reciprocating carriage, devices for throwing the swinging frame over during the movement of the reciprocating carriage and mechanism for slitting the cut sheet of metal into can-body blanks.

8. In a can-body blank cutting machine, the combination with the feed mechanism, the reciprocating carriage which receives the sheet of metal from the feed mechanism, a pair of cutting knives secured to the forward end of the reciprocating carriage, devices for operating said knives with the movement of the carriage, the presser bar secured to and carried by the carriage for holding the sheet of metal while being cut, devices for raising and lowering the presser bar during the movement of the reciprocating carriage, the fixed cutting knife secured to the reciprocating carriage, the swinging sheet-carrying frame and devices for throwing the swinging sheet-carrying frame over during the movement of the reciprocating carriage.

9. In a can-body blank cutting machine, the combination with the reciprocating carriage provided with knives for cutting the ends of the sheet of metal during the reciprocal movement thereof, of the rolls for receiving the cut sheet of metal and slitting the same into can-body blanks.

10. In a machine for cutting can-body blanks, the combination with the feed mechanism for the sheet of metal, the reciprocating carriage for receiving the sheet of metal from the feed mechanism, the cutting knives secured to and carried by the reciprocating carriage, the swinging sheet-carrying frame secured to and carried by the said carriage, the presser bar for holding the sheet of metal while being cut, devices for raising and lowering the presser bar, mechanism for throwing the swinging sheet-carrying frame over after the outer end of the sheet has been cut in order that the inner end may be cut, and mechanism for receiving the cut sheet of metal and slitting the same into can-body blanks.

11. In a machine for cutting can-body blanks, the combination with the reciprocating carriage, the cutting knives secured to and carried thereby and actuated during the movement of the carriage, the devices for forming a hook or flange at one of the cut ends and a pocket at the opposite cut end adapted to receive the hook or flange, mechanism for slitting the cut sheet of metal into can-body blanks and the forming rolls which receive the cut blanks from the slitting mechanism and forms the side groove therein and discharges the can-body blanks from the machine.

12. In a machine for cutting the can-body blanks, the combination with the reciprocating carriage provided with cutting knives, the swinging sheet-carrying frame secured to and carried thereby, devices for throwing the said swinging sheet-carrying frame over during the movement of the reciprocating carriage, the presser bar for holding the sheet of metal while being cut and mechanism for receiving the cut sheet of metal and slitting the same into body-blanks.

13. In a machine for cutting can-body blanks, the combination with the reciprocating carriage provided with cutting knives, the swinging sheet-carrying frame for receiving and holding the sheet of metal while being cut and devices for throwing the swinging sheet-carrying frame over during the movement of the reciprocating carriage.

14. In a machine for cutting can-body blanks, the combination with the reciprocating carriage which receives the sheet of metal, the cutting knives secured to and carried thereby and devices for operating the cutting knives during the travel of the reciprocating carriage.

15. In a machine for cutting can-body blanks, the combination with the reciprocating carriage, the cutting knives secured to and operated by the movement of the carriage devices for forming a hook or flange at the end of the sheet of metal after being cut by the first set of cutting knives, the swinging sheet-carrying frame for receiving the sheet of metal and holding the same while being cut, devices for throwing the swinging sheet-carrying frame over after the outer end of the sheet of metal has been cut, so as to cut the opposite end of the sheet as thrown over, the dies for forming a groove or pocket in the last cut end of the sheet, after the sheet-carrying frame has been thrown over, the sliding cross head working with the swinging sheet-carrying frame, devices for moving the cross head in and out of the swinging sheet-carrying frame as swung over, the rolls for receiving and slitting the cut sheet of metal into can-body blanks and the forming rolls which receive the can-body blanks from the slitting rolls and form side grooves in the blanks as passed therethrough.

16. In a can-body blank cutting machine, the combination with the slitting rolls, of the forming rolls which receive the can-body blanks and form side grooves therein for holding the ends of the can while the body blank is rolled therearound.

17. In a machine for cutting can-body blanks, the combination of mechanism for receiving sheets of metal and cutting the ends thereof, devices for forming a hook or flange at one end of the cut sheet and a pocket at the opposite end, mechanism for slitting the cut sheet of metal into can bodies and devices for forming a side groove in the cut body blanks.

18. In a machine for cutting can-body blanks, the combination with the reciprocating feed bed for the sheet metal, of the longitudinally-reciprocating mechanism for receiving the sheet of metal from the feed bed and cutting the end thereof, and devices for slitting the cut sheet of metal and discharging the sheet from the machine cut into a number of body blanks.

19. In a machine for cutting can-body blanks, the combination with the feed mechanism for the sheet metal, the reciprocating carriage provided with cutting knives, the swinging sheet-carrying frame, devices for throwing the swinging frame with the movement of the carriage, the sliding cross head working in and out of the swinging sheet-carrying frame and devices for moving the cross head in and out as the swinging sheet-carrying frame is swung back and forth.

20. In a can body blank cutting machine, the combination with the forming rolls, the guide rolls and movable mechanism for receiving and automatically extracting the formed body blanks from the guide rolls and removing the same from the machine.

21. In a can-body blank cutting machine, the combination with the extracting jaws, the vertically movable lift plate for placing the can-body blanks within the extracting jaws, mechanism for moving the extracting jaws in and out and a device for opening the extracting jaws as moved outward in order to permit the can body blanks to move from within the said jaws.

22. In a can-body blank cutting machine, the combination with the extracting mechanism for the body blanks, of the vertically movable lift plate, mechanism for raising and lowering the same, the plunger rod located above the lift plate, the hinged jaws secured upon the plunger rod which receives the body blanks from the lift plate, mechanism for throwing the plunger rod in and out and a device for opening the hinged jaws as the plunger rod is moved outward in order that the can-body blanks may drop therefrom.

23. In a can-body blank cutting machine, the combination with the mechanism for cutting the ends of the sheet of metal as passed through the machine and forming a hook or flange at one of the cut ends and a pocket at the opposite end to receive the hook or flange and devices for slitting the cut sheet into can-body blanks.

In testimony whereof I affix my signature in presence of two witnesses.

AXEL JOHNSON.

Witnesses:
W. A. ACKER,
LEE D. CRAIG.